US008619191B2

(12) United States Patent
Law et al.

(10) Patent No.: US 8,619,191 B2
(45) Date of Patent: *Dec. 31, 2013

(54) FILTER MODULE FOR A VIDEO DECODING SYSTEM

(75) Inventors: Patrick Law, Milpitas, CA (US);
Darren Neuman, San Jose, CA (US);
David Baer, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/325,158

(22) Filed: Dec. 14, 2011

(65) Prior Publication Data

US 2012/0081602 A1 Apr. 5, 2012

Related U.S. Application Data

(63) Continuation of application No. 12/623,534, filed on Nov. 23, 2009, now Pat. No. 8,085,346, which is a continuation of application No. 10/386,312, filed on Mar. 11, 2003, now Pat. No. 7,636,125.

(60) Provisional application No. 60/420,226, filed on Oct. 22, 2002.

(51) Int. Cl.
*H04N 7/01* (2006.01)
*H04N 3/27* (2006.01)
*H04N 5/268* (2006.01)

(52) U.S. Cl.
USPC .......................... 348/458; 348/554; 348/705

(58) Field of Classification Search
USPC ......... 348/554–558, 445, 706, 705, 458, 571, 348/625; 345/3.2–3.4, 581, 59, 660, 505; 382/234, 260, 304
See application file for complete search history.

(56) References Cited

U.S. PATENT DOCUMENTS

| 5,008,739 | A | * | 4/1991 | D'Luna et al. | 348/246 |
| 5,097,257 | A | * | 3/1992 | Clough et al. | 345/213 |
| 5,218,436 | A | * | 6/1993 | Sugiyama et al. | 348/445 |
| 5,530,484 | A | * | 6/1996 | Bhatt et al. | 348/556 |
| 5,636,290 | A | * | 6/1997 | Kita et al. | 382/167 |
| 5,668,890 | A | * | 9/1997 | Winkelman | 382/167 |
| 5,694,141 | A | * | 12/1997 | Chee | 345/3.1 |
| 5,703,657 | A | * | 12/1997 | Maruoka et al. | 348/554 |
| 5,896,177 | A | * | 4/1999 | Hwang | 348/445 |
| 5,923,384 | A | * | 7/1999 | Enomoto et al. | 348/705 |
| 5,943,097 | A | * | 8/1999 | Horii | 348/441 |
| 6,144,412 | A | * | 11/2000 | Hirano et al. | 348/441 |
| 6,226,642 | B1 | * | 5/2001 | Beranek et al. | 348/211.13 |
| 6,343,309 | B1 | * | 1/2002 | Clarke et al. | 718/106 |
| 6,396,542 | B1 | * | 5/2002 | Patel | 348/445 |
| 6,407,694 | B1 | * | 6/2002 | Cox et al. | 342/13 |
| 6,411,333 | B1 | * | 6/2002 | Auld et al. | 348/441 |
| 6,429,903 | B1 | * | 8/2002 | Young | 348/552 |
| 6,466,226 | B1 | * | 10/2002 | Watson et al. | 345/610 |
| 6,538,656 | B1 | * | 3/2003 | Cheung et al. | 345/519 |
| 6,556,724 | B1 | * | 4/2003 | Chang et al. | 382/299 |

(Continued)

*Primary Examiner* — Victor Kostak

(74) *Attorney, Agent, or Firm* — Thomas | Horstemeyer, LLP

(57) ABSTRACT

Systems and methods are disclosed for filter modules in a video display system or network. One embodiment relates to a method for operating a filter module in a video display network comprising determining a picture type, display type and operation of the display network. The method further comprises determining, in real time, a filter configuration from a plurality of possible filter configurations based on the determined picture type, display type and operation.

20 Claims, 9 Drawing Sheets

(56) References Cited

U.S. PATENT DOCUMENTS

| | | | |
|---|---|---|---|
| 6,580,463 B2* | 6/2003 | Swartz | 348/558 |
| 6,707,467 B1* | 3/2004 | Suga | 345/698 |
| 6,798,458 B1* | 9/2004 | Unemura | 348/448 |
| 6,876,395 B1* | 4/2005 | Muto et al. | 348/441 |
| 6,927,801 B2* | 8/2005 | Yugami et al. | 348/458 |
| 7,020,081 B1* | 3/2006 | Tani et al. | 370/230 |
| 7,047,325 B2* | 5/2006 | Kondo et al. | 710/16 |
| 7,224,402 B2* | 5/2007 | Cho | 348/558 |
| 2003/0026495 A1* | 2/2003 | Gondek et al. | 382/261 |
| 2004/0061804 A1* | 4/2004 | Favrat et al. | 348/554 |

* cited by examiner

FILTER MODULE FOR A VIDEO DECODING SYSTEM

CROSS-REFERENCE TO RELATED APPLICATIONS

This application is a continuation of application Ser. No 12/623,534 filed Nov. 23, 2009, which is a continuation of application Ser. No. 10/386,312 filed Mar. 11, 2003 titled "Filter Module for a Video Decoding System", which is related to, and claims benefit of and priority from, Provisional Application No. 60/420,226 filed Oct. 22, 2002, titled "Filter Module for a Video Decoding System", the complete subject matter of which is incorporated herein by reference in its entirety.

This application also makes reference to U.S. Provisional Application Ser. No. 60/420,152 filed Oct. 22, 2002, titled "A/V Decoder Having A Clocking Scheme That Is Independent Of Input Data Streams"; U.S. patent application Ser. No. 10/300,371 filed Nov. 20, 2002, titled "A/V Decoder Having A Clocking Scheme That Is Independent Of Input Data Streams"; U.S. Provisional Application Ser. No. 60/420,136 filed Oct. 22, 2002, titled "NCO Based Clock Recovery System and Method for A/V Decoder"; U.S. patent application Ser. No. 10/313,237 filed Dec. 5, 2002, titled "NCO Based Clock Recovery System and Method for A/V Decoder"; U.S. Provisional Application Ser. No. 60/420,344 filed Oct. 22, 2002, titled "Data Rate Management System and Method for A/V Decoder"; U.S. Provisional Application Ser. No. 60/420, 342 filed Oct. 22, 2002, titled "A/V System and Method Supporting a Pull Data Flow Scheme"; U.S. patent application Ser. No. 10/300,234 filed Nov. 20, 2002, titled "A/V System and Method Supporting a Pull Data Flow Scheme"; U.S. Provisional Application Ser. No. 60/420,140 filed Oct. 22, 2002, titled "Hardware Assisted Format Change Mechanism in a Display Controller"; U.S. patent application Ser. No. 10/300,370 filed Nov. 20, 2002 titled "Hardware Assisted Format Change Mechanism in a Display Controller"; U.S. Provisional Application Ser. No. 60/420,151 filed Oct. 22, 2002, titled "Network Environment for Video Processing Modules"; U.S. patent application Ser. No. 10/314,525 filed Dec. 9, 2002 titled "Network Environment for Video Processing Modules"; U.S. Provisional Application Ser. No. 60/420, 347 dated Oct. 22, 2002, titled "Video Bus For A Video Decoding System"; and U.S. Provisional Application Ser. No. 60/420,308 filed Oct. 22, 2002, titled "Multi-Pass System and Method Supporting Multiple Streams of Video" are each incorporated herein by reference in their entirety.

FEDERALLY SPONSORED RESEARCH OR DEVELOPMENT

Not Applicable

SEQUENCE LISTING

Not Applicable

MICROFICHE/COPYRIGHT REFERENCE

Not Applicable

BACKGROUND OF THE INVENTION

The present invention relates to a filter module. More specifically, the present invention relates to a filter module for a video decoding system, where the video decoder system is adapted to process, decode or decompress one or more input data streams (alternatively referred to as "input data", "input data streams" or "data streams").

It is contemplated that the video decoding system may accommodate one or more picture types, display types and operations. Such different picture types display types and operations may require different filters used for scaling, sub-sampling, de-interlacing, etc. The addition of multiple filter modules as such may cause the video decoder system to be more complex, large and consume more energy.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Features of the present invention may be found in a filter module used, in one embodiment in a video decoding system and method of determining such a filter module on the fly (i.e., in real time). More specifically, the filter module is adapted to be used in a network in the video decoding system, wherein the network is adapted to form at least one display pipeline from a plurality of display pipelines.

One embodiment of the present invention relates to a method of operating a filter module in a for a video display system. In this embodiment, the method comprises determining a picture type of the display network, determining a display type of the display network and determining an operation of the display network. The method further comprises determining, in real time, a filter configuration from a plurality of possible filter configurations based on the determined display network, display type and operation of the display network.

Yet another embodiment of the present invention relates to a method of operating a filter module in a video display system. This method comprises determining if a picture type of the display network is frame based video, field based video or graphics; determining if a display type of the display network is progressive or interlaced; and determining if an operation of the display network is at least no scaling, interpolation or decimation. The method further comprises determining, in real time, a filter configuration form a plurality of possible filter configurations based on the determined picture type, display type and operation.

Still another embodiment of the present invention relates to a filter module used in a network for processing data, the filter module being adapted to form one filter configuration from a plurality of possible filter configurations. In this embodiment, the network is adapted to form at least one display pipeline from a plurality of display pipelines. The filter module may comprise one or more FIR filters, one or more ARC filters and one or more AFF filters. Additionally, the filter module may also include such filter functions as pre-filtering and de-interlacing. It is contemplated that each filter module may be comprised of one filter, a plurality of the same type of filter, or a combination of different types of filters or filter functions.

These and other advantages and novel features of the present invention, as well as details of an illustrated embodiment thereof, will be more fully understood from the following description and drawings.

DETAILED DESCRIPTION OF THE INVENTION

The following description is made with reference to the appended figures.

Figure 1:
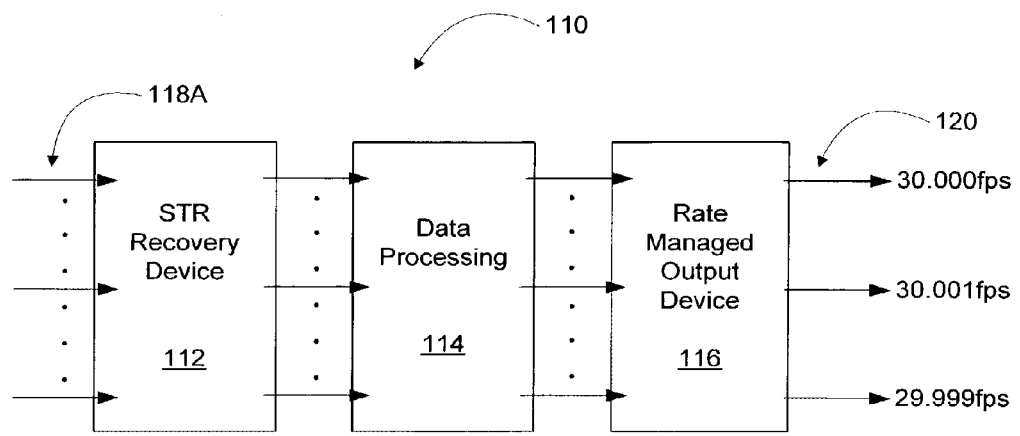
FIG. 1 illustrates one embodiment of a block diagram of an A/V decoder in accordance with the present invention.
Figure 2:
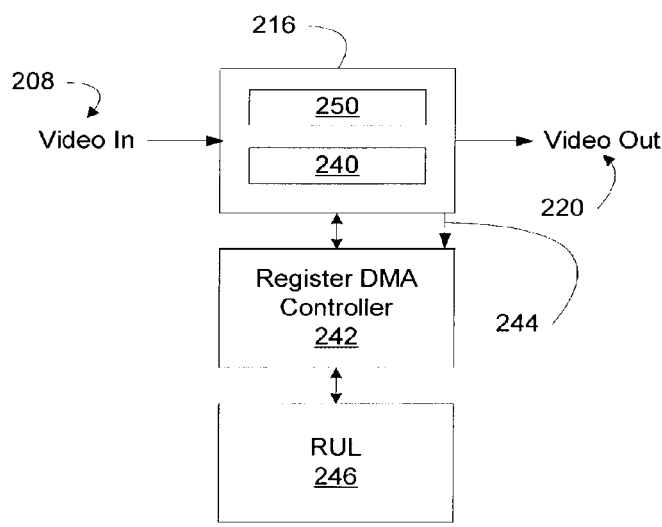
FIG. 2 illustrates one embodiment of a block diagram of an A/V system having a network in accordance with the present invention.

One embodiment of the present invention relates to filter modules. More specifically, one embodiment relates to filter modules in a network environment in an audio/video decoder system. FIGS. 1 and 2 illustrate block diagrams of embodiments of an A/V decoders in accordance with the present invention.

FIG. 1 illustrates one embodiment of a high level block diagram of embodiment of an A/V decoder, generally designated 110. More detail about the A/V decoder is provided in U.S. Provisional Application Ser. No. 60/420,152 filed Oct. 22, 2002, titled "A/V Decoder Having A Clocking Scheme That Is Independent Of Input Data Streams" and U.S. patent application Ser. No. 10/300,371 filed Nov. 20, 2002, titled "A/V Decoder Having A Clocking Scheme That Is Independent Of Input Data Streams", the complete subject matter of each of which is incorporated herein by reference in its entirety. In the illustrated embodiment, the decoder 110 comprises a system time reference recovery device 112 (alternatively referred to as an "STR recovery device") having one or more input data streams 118.

The STR recovery device 112 is illustrated communicating with an A/V data processing device 114. In one embodiment of the invention, STR refers to a reference time value. It is anticipated that different or more complex systems are also possible and within the scope of the present invention. For example if the A/V decoder 110 has more than one data source, the decoder may include more than one STR recovery device, where the number of STR recovery devices may or may not correspond to the number of data sources. More detail about the STR recovery devices is provided in U.S. Provisional Application Ser. No. 60/420,136 filed Oct. 22, 2002, titled "NCO Based Clock Recovery System and Method for A/V Decoder" and U.S. patent application Ser. No. 10/313,237 filed Dec. 5, 2002, titled "NCO Based Clock Recovery System and Method for A/V Decoder", the complete subject matter of each of which is incorporated herein by reference in its entirety.

As an alternative to the MPEG scheme, an A/V system incorporating an A/V decoder may accept analog television signals as inputs. In this embodiment, the analog video input goes through, and is processed or decoded by, the A/V data processing device 114, which may comprise a video decoder or VDEC. Likewise, analog audio goes through, and is processed or decoded by, the A/V data processing device 114 which may further comprise a BTSC audio decoder (alternatively referred to as a "ADEC" or "BTSC"). More detail about the data processing devices is disclosed in U.S. Provisional Application Ser. No. 60/420,342 filed Oct. 22, 2002, titled "A/V System and Method Supporting a Pull Data Flow Scheme" and U.S. patent application Ser. No. 10/300,234 filed Nov. 20, 2002, titled "A/V System and Method Supporting a Pull Data Flow Scheme", the complete subject matter of which is incorporated herein by reference.

One embodiment of the present invention uses a system clock (a fixed system clock for example) to control the data processing. More specifically, the system clock may be used to control the data process in a network in accordance with the present invention. It is contemplated that the STR recovery device 112 may be locked to the analog video line rate. The analog hysncs are converted into a psuedo-STR using a simple counter in one embodiment. The STR recovery device 112 locks to this psuedo-STR and broadcasts the recovered STR to the rest of the decoder 110. The broadcast STR is used to control the output rates as provided previously.

FIG. 1 further illustrates a rate managed output device 116, which is illustrated as communicating with the data processing device 114. In the illustrated embodiment, the rate managed output device 116 has one or more A/V outputs 120, which are output at the same or different rates. In FIG. 1, three A/V outputs, generally designated 120, are illustrated. For example, one A/V output is output at 29.999 frames per second (alternatively referred to as "fps"), one is output at 30.001 fps and one is output at 30.000 fps.

In one embodiment, the A/V data processing device 114 includes a network environment for video processing modules. The data processing device 114 bases audio and video processing on multiples of a single, fixed clock, a 27 MHz crystal clock for example. It is contemplated that, as a single fixed clock is used, the processing is not constrained by clock boundaries. Video and audio may be muxed between modules. It is further contemplated that such architecture may be made orthogonal, and easy to control.

In accordance with one embodiment, all data, including all audio and video data, is processed by a network environment and transferred using a "pull" model or mode, even though typical A/V streams (e.g., MPEG) are adapted to operate according to a push model or mode. The outputs request data as needed. Each module in the A/V decoder 110 may supply data to its outputs at the rate it is requested. Because a pull model or mode is used, the data processing clock (i.e., the system clock) is not tied to the input data rate. For example, the audio decoder may be clocked at 243 MHz, 133 MHz, or any other reasonable rate. The audio decoder clock does not need to "track" the input data rate.

Conventional A/V decoders use a VCXO or VCXO-PLL to lock the chip clock to the input data rate. However, one embodiment of the present invention uses rate managed output devices 116 and the associated SRC devices to change or adjust the video and audio output rates.

It is contemplated that, in one embodiment of the present invention, the output data rate tracks the STR. If the A/V decoder decodes multiple video streams, there may be multiple STRs. Each output data rate tracks an associated STR. The process of controlling the output rates may be called "rate management." In one embodiment, the rate managed output device 116 (alternatively referred to as a "output rate manager" or "output rate manager PLL"), comprising for example a digital PLL, is used to compare the output rate with the STR, and adjust the output rate accordingly, such that the output data rate matches the STR and the input data rate. In one embodiment the A/V decoder may include several output rate managers, one for each output of the A/V decoder. More detail about rate managers is provided in U.S. Provisional Application Ser. No. 60/420,344 filed Oct. 22, 2002, titled "Data Rate Management System and Method for A/V Decoder" the complete subject matter of which is incorporated herein by reference.

FIG. 2 illustrates one embodiment of a block diagram of a video decoding system or network in accordance with the present invention. In this embodiment, the network 216 is adapted to receive video-in 208 (from a memory for example) and output video-out 220.

FIG. 2 further illustrates the system or network 216 containing at least one display pipeline 240 and filter module 250. In one embodiment of the present invention, the display pipeline 240 is changeably formed by chaining, coupling or concatenating one or more network nodes together on the fly (i.e., in real time), depending on the network requirements. It is contemplated that the nodes may be re-configured, so that a plurality of display pipelines 240 may be formed, each pipeline having a different functionality depending on the nodes that are concatenated together. Moreover, in one embodiment, it is contemplated that the network 240 may change the display pipeline 240 every $\frac{1}{60}^{th}$ of a second for example (i.e., real time).

In the illustrated embodiment, filter module 250 comprises one or more filters adapted to be configured (i.e., coupled together in the filter module) on the fly (i.e., in real time) depending on the picture type (i.e., frame based video, field based video and graphics), display type (i.e., progressive or interlace) and the operation (i.e., no scaling, ARC, interpolation and decimation). It is contemplated that the filter module may comprise an FIR filter, ARC, AFF, prefiltering and de-interlacing, alone or in some combination.

In this embodiment, a register DMA controller 242 (alternatively referred to as an "RDC") is illustrated coupled to the network 216 and one or more register update lists 246 (alternatively referred to as an "RUL"). The RDC 242 is adapted to support multiple, configurable pipelines 240 and the configurable filter module 250 by accessing and fetching (i.e., obtaining) one or more instructions from the RUL 246 and providing such instructions to configure at least one display pipeline 240 from a plurality of possible display pipelines and the required filters in the filter module 250. In one embodiment, the RDC 242 accesses the RUL 246 (fetching the instructions) in response to the one or more trigger signals 244 (real time DMA trigger signals or events generated by the last node in the pipeline 240 for example). It is contemplated that, if the network 216 did not have an RDC 242 associated therewith, the network 216 would have to reconfigure the pipeline one register at a time.

Figure 3:
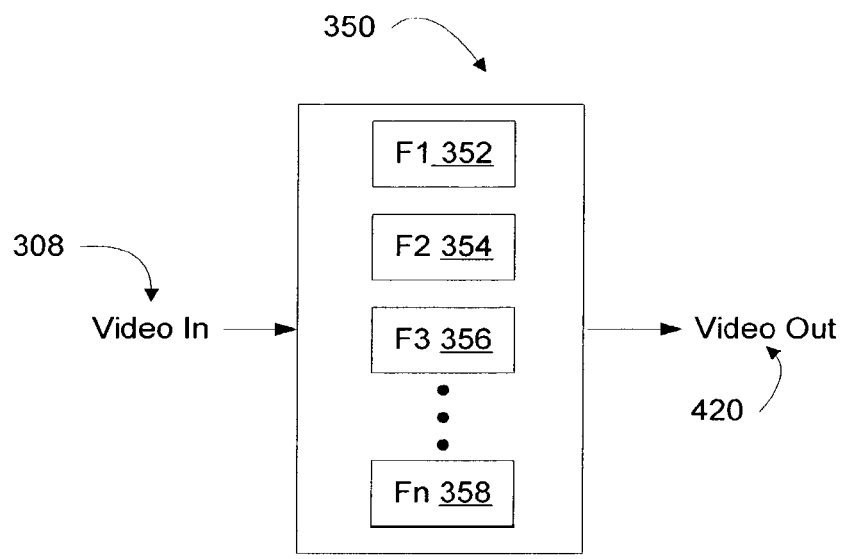
FIG. 3 illustrates one embodiment of a filter module having one or more filters in accordance with the present invention.

FIG. 3 illustrates one embodiment of a filter module 350 similar to the filter module 250 of FIG. 2. In this embodiment, the filter comprises one or more filters (F1 through Fn designated 352 through 358 respectively). In this embodiment, the filters are adapted to be configured (i.e., coupled together) on the fly by the RDC and RUL depending on the picture type (i.e., frame based video, field based video and graphics), display type (i.e., progressive or interlace) and the operation (i.e., no scaling, ARC, interpolation and decimation) as illustrated in Table 1. For example, it is contemplated that F1 may comprise a FIR, F2 may comprise an AFF and F3 may comprise an ARC.

Figure 4:
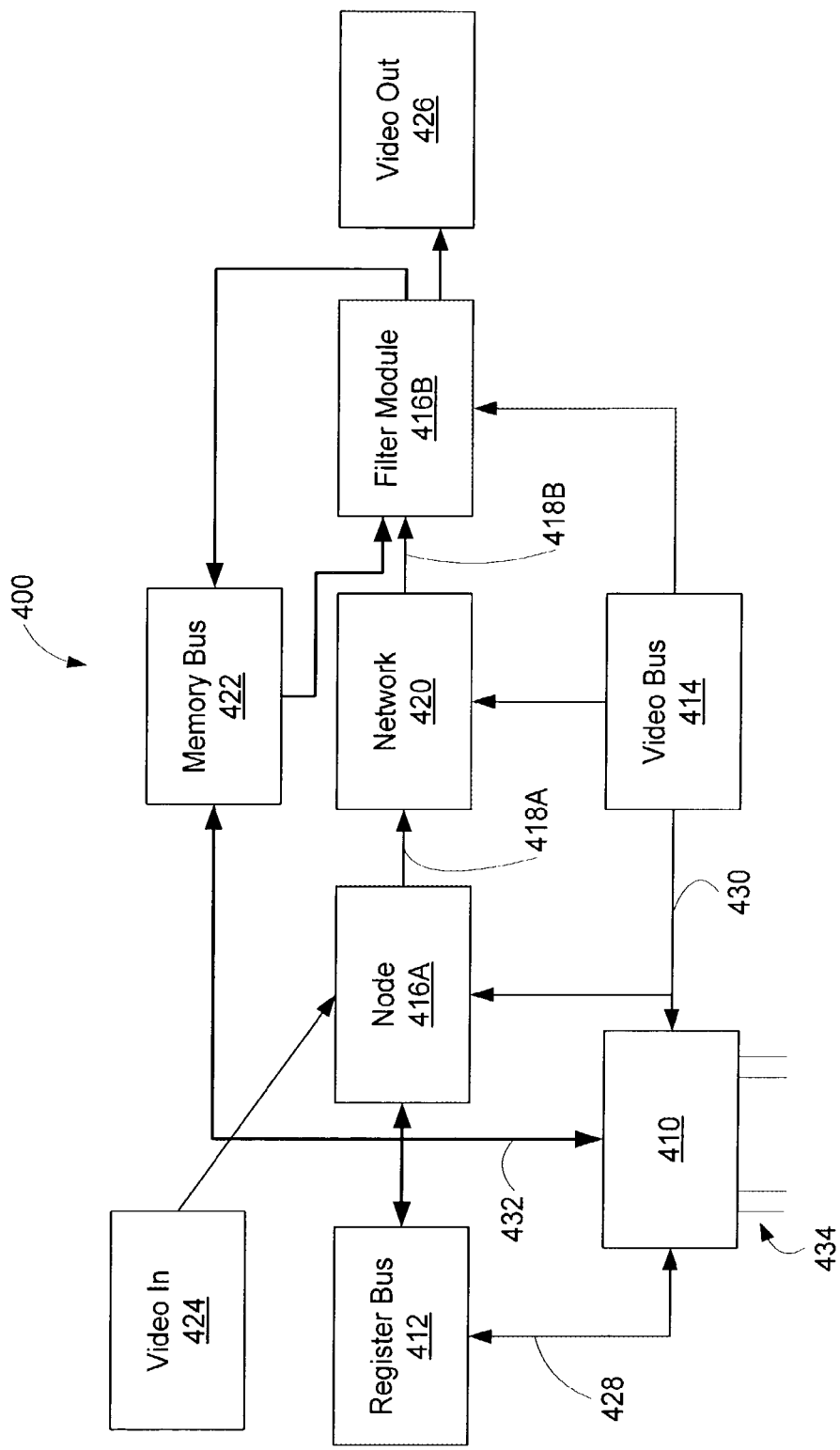
FIG. 4 illustrates one embodiment of a block diagram of a network environment for videoprocessing modules.

FIG. 4 illustrates one embodiment of a block diagram of a network environment (alternatively referred to as a "display engine") for video processing modules in accordance with the present invention. The network, generally designated 400, is adapted to support a pull data scheme and comprises at least a register DMA controller, one or more nodes, one or more links, and one or more network modules. In this embodiment, the register DMA controller 410 (also referred to as a "bridge") is responsible for register access within the system 400. The register DMA controller 410 connects the register bus 412 (alternatively referred to as "RBUS") with the video register bus 414 (alternatively referred to as "VBUS"). However, other decoders, with or without STR recovery devices, are contemplated. More detail about the network is provided in U.S. Provisional Application Ser. No. 60/420,151 filed Oct. 22, 2002, titled "Network Environment for Video Processing Modules" and U.S. patent application Ser. No. 10/314,525 filed Dec. 9, 2002 titled "Network Environment for Video Processing Modules", the complete subject matter of which is incorporated herein by reference.

The system 400, in one embodiment, further comprises one or more nodes 416 (two nodes 416A & 416B are illustrated where node 416B comprise a configurable filter module). Nodes 416 are modules that process video information (nodes 416A & 416B are illustrated having video-in signals 414 and video-out signals 426 respectively). Some examples of nodes comprise video scalers, 2D graphics compositors, video encoders, etc.

FIG. 4 further illustrates one or more links 418 (links 418A & 418B are illustrated). In this embodiment, the links 418 comprise a set of signals or buses that tie or connect at least two nodes together (link 418A is illustrated coupling node 416A to network module 420 while link 418B is illustrated coupling network module 420 to node 416B). The links 418 are adapted to transfer information using a predefined protocol. However, other decoders, with or without STR recovery devices, are contemplated. More detail about the link is provided in U.S. Provisional Application Ser. No. 60/420,347 dated Oct. 22, 2002, titled "Video Bus For A Video Decoding System" the complete subject matter of which is incorporated herein by reference.

Additionally, system 400 comprises one or more network modules 420 that, in this embodiment, are specialized nodes that don't perform video processing functions. Rather, the network module 420 connects at least two or more links 418 together, routing information between them. In general, the system 400 may include a number of pipelines (i.e., display pipelines) formed by chaining multiple nodes together. Each display pipeline starts at one or more nodes 416, where it is contemplated that each node has a memory interface to a frame buffer (not shown in FIG. 4). Functions are added to the pipeline by cascading more nodes to the pipelines. Finally, a pipeline ends at one or more nodes, where each such node is a desired output channel.

In accordance with the present invention, the register bus or RBUS 412 is connected to the video register bus or VBUS 414 through the register DMA controller 410. In this embodiment, both buses use identical signaling and protocols. The register DMA controller 410 acts as a slave to the RBUS 412 and forwards transactions to VBUS 414. In addition, register DMA controller 410 may perform one or more Register DMA operations, which comprises decoupling a host from video timing by automating mode changes.

In one embodiment, register DMA controller 410 includes four interfaces. There are two register bus interfaces, one interface 428 coupling the register DMA controller 410 to RBUS 412 and the other interface 430 coupling the register DMA controller 410 to VBUS 414. The third interface is a memory bus interface 432 coupling the register DMA controller 410 to the memory bus 422 (alternatively referred to as "MBUS"). The memory bus 422 is used to access register writes from an external memory. Finally the last interface 434 comprises an array of signals coming from at least one of the nodes 416, which are used as DMA triggers.

In accordance with one embodiment, display modes or pipelines are configured or changed using control registers. Instead of updating the display modes one at a time, the host uses the register DMA controller, feature or operation to automate the process. In this embodiment, the Register DMA comprises three entities: a register update list, a DMA descriptor and a DMA trigger as provided below.

Figure 5:
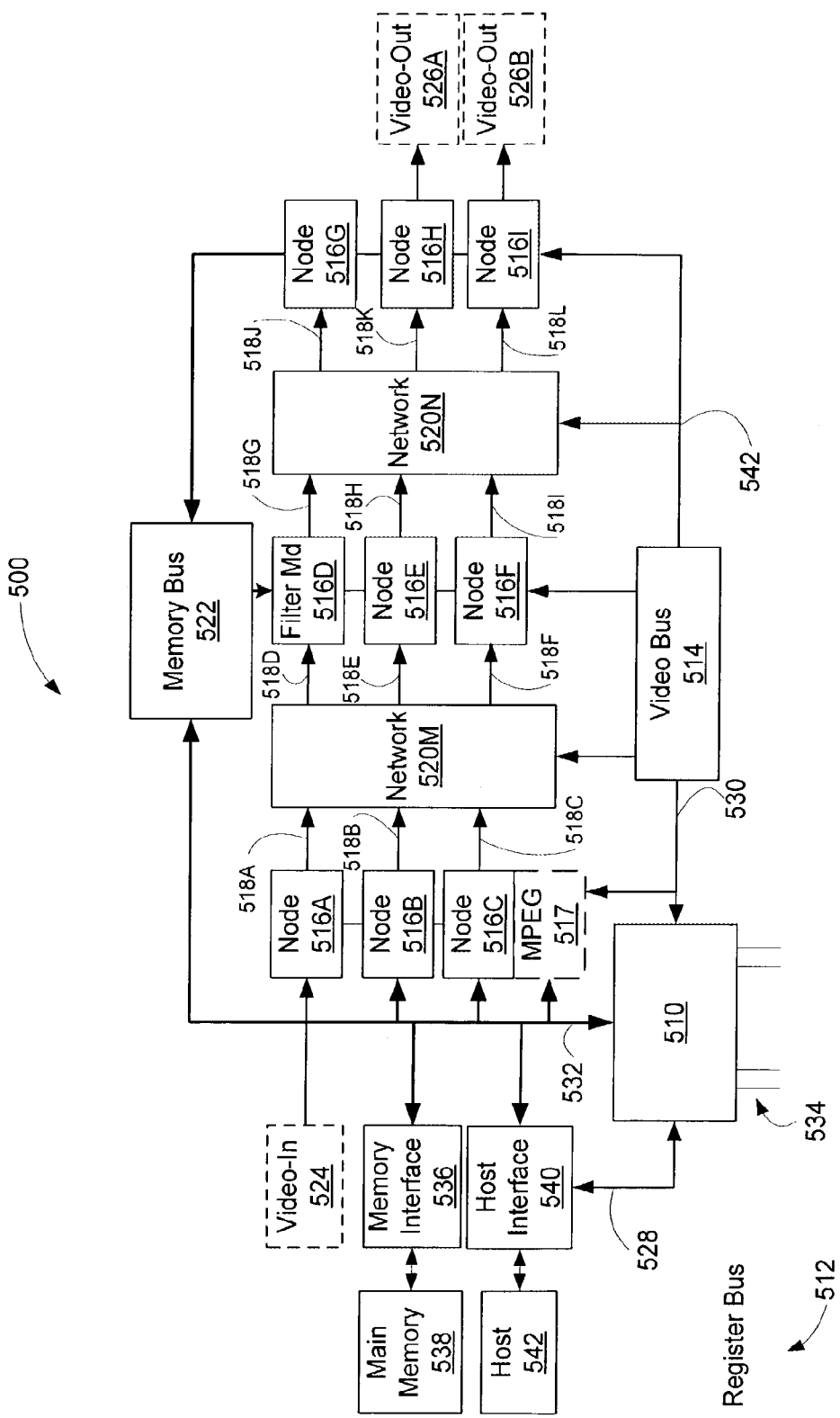
FIG. 5 illustrates another embodiment of a block diagram of a network environment in accordance with the present invention.

FIG. 5 illustrates another embodiment of a block diagram of a network or display engine according to the present invention. In this embodiment, the network, generally designated 500, video processes modules and is further adapted to support a pull data scheme. Register DMA controller 510 is responsible for register accesses within the network 500. The register DMA controller 510 connects the register bus or RBUS 512 with the video register bus or VBUS 514.

In this embodiment, the RBUS 512 comprises at least one video-in module 524 coupled to and communicating with at least one node (Node 516A for example). Further the RBUS 512 may comprise a memory interface 536 coupled to and communicating with at least the memory bus 522 (using memory bus interface 532 for example) and main memory 538; and a host interface 540 communicating with at least the memory bus 522 (using memory bus interface 532 for example), host 542 and register DMA controller (using interface 528 for example).

The network 500, in this embodiment, comprises a plurality of nodes 516 (nine nodes 516A-516I are illustrated) adapted to process video information. While only nine nodes are illustrated, more (or less) nodes are contemplated. Again, the nodes 516 process video information (node 516A is illustrated having video-in signals 524 communicating therewith, node 516D comprises a filter module, while nodes 516H and 516I are illustrated having video-out signals 526A and 526B respectively communicating therewith). In this embodiment an optional MPEG decoder 517 is illustrated coupled to node 516C, and communicating with video bus 514, register DMA controller 510 and memory bus 522.

FIG. 5 further illustrates a plurality of links 518 (12 links 518A-518L are illustrated). Again, while 12 links 518 are shown, a different number is contemplated. In this embodiment, the links 518 comprise a set of signals or buses that tie at least two nodes 516 together and transfer information using a predefined protocol.

Additionally, network 500 comprises a plurality of specialized nodes or network modules 520 that, in this embodiment, connect at least two or more links 518 together, routing information therebetween. It is again contemplated that, in general, the network 500 may include a number of display pipelines formed by chaining multiple nodes together using the network modules 520 to switch between the nodes 516, thus varying or changing the pipeline. Each pipeline starts and ends at one or more nodes 516, where it is contemplated that each node has a memory interface 536 to a frame buffer. Functions are added to the pipelines by cascading that pipeline with more nodes.

Figure 6:
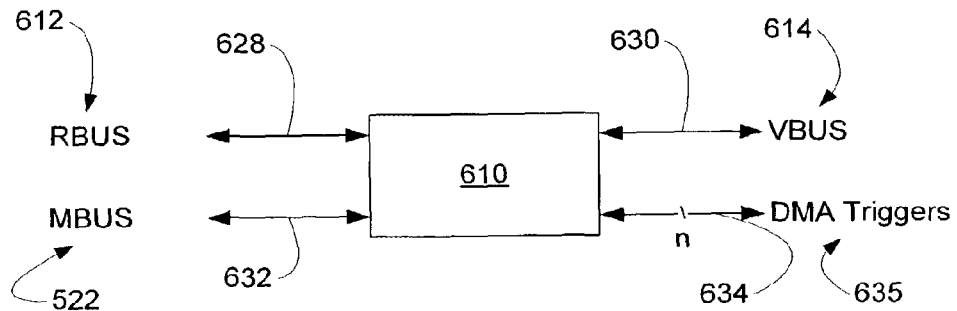
FIG. 6 illustrates one embodiment of a register DMA controller in accordance with one embodiment of the present invention.

In accordance with the present invention, the RBUS 512 is connected to the VBUS 514 through the register DMA controller 510. In this embodiment, both buses use identical signaling and protocols. The register DMA controller 510 acts as a slave to the RBUS 512 and forwards all the transactions to VBUS 514. In addition, the Register DMA 510 decoupes the host from video timing using automating mode changes to FIG. 6 illustrates one embodiment of a block diagram of a register DMA controller 610 including four interfaces similar to that provided previously. There are two register bus interfaces, one interface 628 coupling the register DMA controller 610 to RBUS 612 and the other interface 630 coupling the register DMA controller 610 to VBUS 614. The third interface is a memory bus interface 632 coupling the register DMA controller 610 to the memory bus 622. Finally, interface 634 comprises an array of signals (0-n) coupled to at least one of the nodes 616, which are used as DMA triggers, and generally designated 635.

The register DMA controller is adapted to support register DMA operations or functions in accordance with the present invention. Four interfaces are coupled to and communicating with the register DMA controller as provided previously: one interface coupling the register DMA controller to RBUS; one interface coupling the register DMA controller to VBUS; one interface coupling the register DMA controller to the memory bus; and one interface, comprising an array of signals, which are used as DMA triggers. It is further contemplated that, in this embodiment, the register DMA controller is comprised of at least five modules including a DMA engine; descriptors; RUL FIFO; one or more BUS multiplexers; and one or more filters.

In this embodiment, the DMA engine accesses one or more RULs from the main memory using the memory bus used to configure the filter module on the fly (i.e., in real time). The engine services the DMA channels according to the configuration specified by the descriptors. Further, each DMA channel consists of a trigger and a descriptor, such that, in this embodiment the number of DMA channels equals the number of triggers and descriptors.

Register DMA controller further comprises an RUL FIFO coupled to at least the DMA engine, which is adapted to buffer the bursty memory bus into the slower register bus. In this embodiment, the size of the FIFO is optimized to reduce the DMA response time. The register DMA controller further includes at least one filter that, in one embodiment, lowers the DMA response time by reducing the traffic on the video register bus. The filter is adapted to screen the register bus, forwarding accesses related to the video register bus. A bus multiplexer or mux is illustrated coupled to the RUL FIFO and filter, and is adapted to convert RULs into individual register writes. In addition, the BUS mux arbitrates the video register bus between the DMA register writes and register accesses filtered from the register bus.

Figure 7:
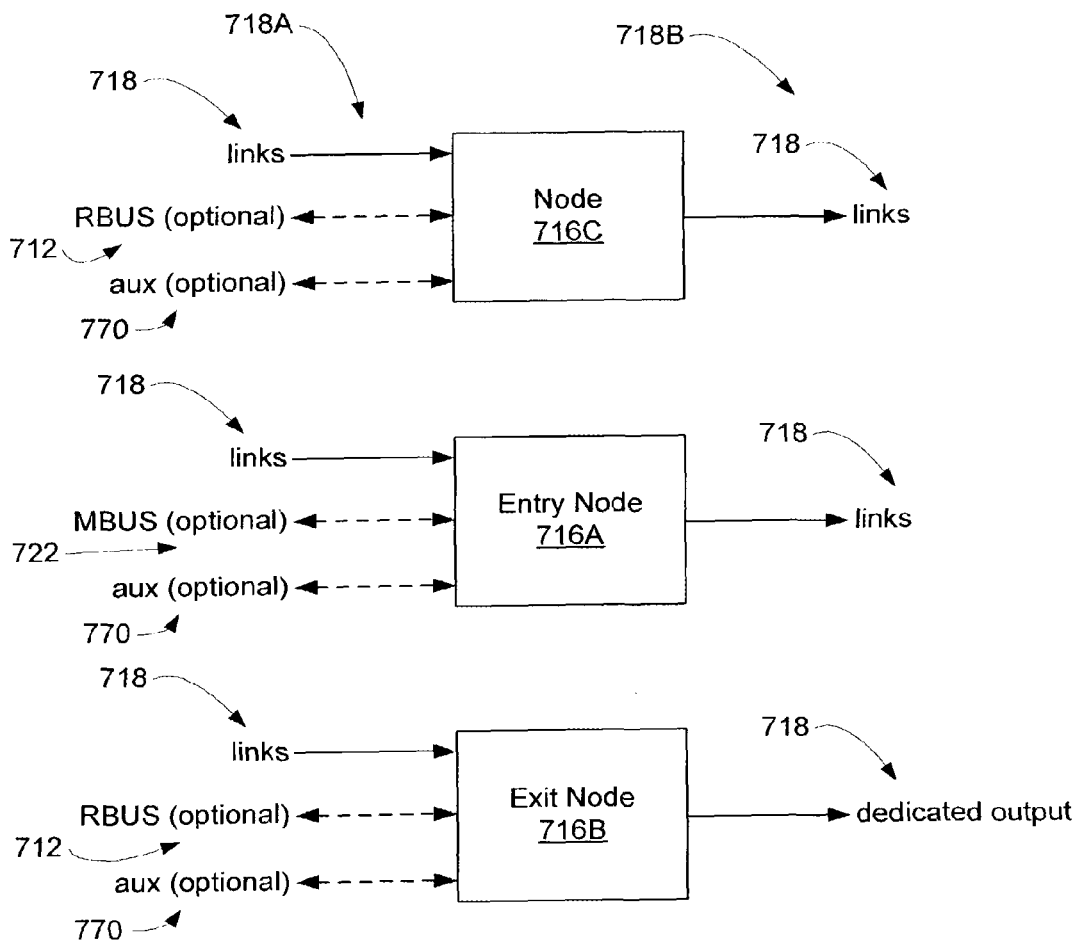
FIG. 7 illustrates embodiments of block diagrams of nodes in accordance with the present invention.

FIG. 7 illustrates different embodiments of the nodes, generally designated 716, used in one embodiment of the network. The network, in accordance with the present invention, is adapted to perform video processing functions similar to a display engine, including video playback, scaling, encoding, etc. It is contemplated that each node 716 in the network may be generally divided into three categories according to its position in a display pipeline: entry, exit, and intermediate. Video data enters a display pipeline at an "entry node" designated 716A and leaves at an "exit node" designated 716B. All the nodes in-between are referred to as "intermediate nodes" or "nodes" designated 716C. Examples of entry nodes 716A include MPEG display feeders, playback engines, etc.

Examples of exit nodes 716B include video encoders, capture engines, etc. Examples of intermediate nodes 716C include scalers, compositors, etc. It is further contemplated that the position of each node in the pipeline configuration is not fixed; rather its position varies depending on the display pipeline (i.e., an entry node in one pipeline may be an intermediate node in another display pipeline).

As illustrated, the nodes 716 each generally include at least one input and output interface or link 718 communicating therewith. It is contemplated however that each node 716 is adapted to have multiple input or output links 718A & 718B coupled thereto and communicating therewith (a compositor for example has multiple input links). Furthermore, each node 716 may also have an optional RBUS 714, MBUS 722 or some other optional auxiliary interface 780 (a DMA trigger for the register DMA controller for example) communicating therewith. If the node 716 is an entry node 716A, it is contemplated that the input link is an MBUS interface 722 as illustrated. For exit nodes 716B, the output is replaced by a dedicated output 750 (e.g., a memory interface for a capture engine or an analog video output for a video encoder).

As provided previously, a display pipeline in the network starts or begins at one or more entry nodes 716A. The entry node 716A is responsible for feeding video to the downstream nodes 716 and includes, for example, MPEG display feeders and playback engines. In one embodiment, the input to an entry node 716A may comprise RBUS and memory interfaces. Its output may comprise one or more output links 718B. In addition, the entry node 716A may include one or more auxiliary interfaces 770 such as a DMA trigger for the register DMA controller.

The intermediate node 716C, in one embodiment, may have specific functions comprising scaling, compositing, etc. One or more nodes are added to a display pipeline as its features are used to satisfy certain output requirements. In general, the input and output of an intermediate node 716C comprises one or more links 718A & 718B as provided previously. In addition, the intermediate node 716C may have an optional register bus interface or some other auxiliary interface 770 coupled thereto and communicating therewith.

As provided previously, the display pipeline ends at exit node 716B, which may comprise a video interface such as a composite signal encoder or capture engine for example. In general, the inputs to an exit node 716B consist of an input link 718, an optional register bus 712, and a video output or a memory bus interface 770.

In addition to the functions described previously, the exit nodes 716B may include some debugging functions. For example, a checkpoint register may be written into control packets and read by the register bus 712. This register is programmed in every field to a field dependent number. At the same time, a host may check the progress of the video packets by monitoring this register through the register bus 712.

It is contemplated that exemplary embodiments of the nodes 712 should meet certain requirements in order to maintain intra- and inter-packet synchronization. For example, the nodes should be adapted to forward incoming control packets without being modified. If the node is a multi-input node, one particular input may be designated as the primary link, such that the control packets of the primary links are forwarded, while control packets from other inputs are terminated.

It is contemplated that exemplary nodes 716 process and output packets in their arriving order. If the node is a multi-input node, it may only operate on packets corresponding to the same field in time. For example, if the node 716 is a graphics compositor, the i-th field of one input may be combined with the i-th field of another input. If the active input is not receiving any data, other inputs and the outputs may be stalled.

If the exemplary node 716 is a multi-output node, control and video packets may be forwarded to all the output links. Stalling by one of the output links stalls the inputs as well as the other outputs. Unused input or output links of such exemplary nodes 716 may be disabled using RBUS 712 and the control register. The disabled link may be excluded from controlling other inputs or outputs. For a pipelined node, the next field's control packet should not have any effect on current field's video packet.

Figure 8:
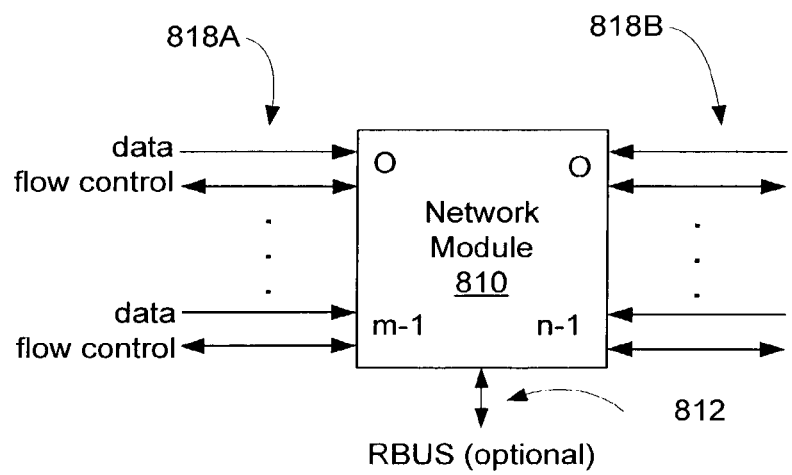
FIG. 8 illustrates one embodiment of a network module in accordance with one embodiment of the present invention.

FIG. 8 illustrates one embodiment of a network module 820 in accordance with the present invention. In this embodiment, the network module 820 comprises a plurality of network interfaces or links generally designated 818 and switches, described in greater detail below. One or more network modules are used to connect one or more nodes, forming at least one display pipeline from a plurality of possible display pipelines. Since the nodes may be re-configured, it is contemplated that display pipelines having different functionality may be implemented for different applications. In other words, the display pipelines are dynamic and not static.

The network interfaces 818, in this embodiment, comprise input and output links 818A & 818B respectively, and an optional register bus 812. In this embodiment, m input links 818A and n output links 818B are illustrated, where m and n may be the same or different. It is contemplated that m may be greater than, equal to or less than n (i.e., the number of input links 818A may be greater than, equal to or less than the number of output links 818B).

It is contemplated that different types of network modules may be used within the register DMA controller or display engine. The network module 820, in accordance with the present invention, is comprised of an array of switches coupled together using predefined topology. This topology determines the network module's routing capabilities, as well as the implementation cost.

As discussed, in one embodiment of the present invention a network display engine may include a filter node or module, wherein such filter module may be used for scaling, sub-sampling, de-interlacing, etc. in the network. In one embodiment of the present invention, the filter module is comprised of one or more filters including for example, one or more FIR filters, one or more ARC filters and one or more AFF filters. Additionally, the filter module may also include such filter functions as pre-filtering and de-interlacing. It is contemplated that each filter module may be comprised of one filter, a plurality of the same type of filter, or a combination of different types of filters or filter functions illustrated in Table 1 for example.

It is also contemplated that the filter module comprising one or more filters is dependant on the picture type (i.e., frame based video, field based video and graphics), display type (i.e., progressive or interlace) and the operation (i.e., no scaling, ARC, interpolation and decimation) as illustrated in Table 1. In this embodiment, the configuration of the filters in the filter module may change on the fly as controlled by the DMA and the RUL (i.e., one or more register write instructions).

As illustrated, an FIR filter (a 2D polyphase FIR filter for example) may be used to perform interpolation and decimation in picture and display type. A single set of coefficients may be used for different interpolation ratios. It is contemplated that the coefficients may vary according to the decimation ratio. Pre-filtering (memory-to-memory decimation for example) may be used if the scale factor is smaller than a predetermined amount. Pre-filtering is utilized to alleviate the peak bandwidth requirement of an FIR filter for example. In one embodiment, pre-filtering may be used in the decimation operation in any picture and display type.

An adaptive-temporal filtering method is preferred for de-interlacing a field-based video. However, it is also contemplated that vertical interpolation with phase adjustment may be used for de-interlacing a field based video. An ARC filter (a 1D polyphase filter for example) may be used to change the aspect ratio of a graphics plane using horizontal scaling. However, 1D polyphase filters may have a different frequency response than its video counterpart as graphics are synthetic and contain more high frequency features. An AFF is a vertical low pass filter used to filter a frame-based picture before the picture may be displayed on an interlace device. It is contemplated that a video AFF may have a different frequency response than a graphics AFF. However, some SD frame pictures are pre-filtered for displaying an interface. In that case, no AFF is required.

configuration of a filter module used in frame based video with an interlaced display type during a decimation operation comprises a combination of FIR filter and pre-filtering.

Table 1 illustrates a seventh configuration of a filter module used with field based video with a progressive display type during a no scaling operation, comprising a de-interlace filter, where the FIR filter may subsume the function of the de-interlace filter. An eighth configuration of a frame module used with field based video with a progressive display type during an interpolation operation is illustrated. In this module, a FIR filter may be used with a de-interface filter, where again the FIR filter may subsume the de-interlace function. A ninth configuration of a filter module comprising an FIR filter, pre-filtering and de-interlacing may be used in field based video with a progressive display type during a decimation operation.

No filtering is needed in a tenth configuration of a filter module illustrated in Table 1, used with field based video with an interlaced display type during a no scaling operation. An eleventh configuration of a filter module used in field based

TABLE 1

| Picture Type | Display Type | Operation | FIR | Pre-filtering | De-interlace | ARC | AFF | Description |
|---|---|---|---|---|---|---|---|---|
| Frame based video | Progressive | No scaling | | | | | | No filtering is used. |
| | | Interpolation | * | | | | | High quality filtering is used. |
| | | Decimation | * | * | | | | |
| | Interlace | No scaling | | | | | * | The FIR filter could subsume the |
| | | Interpolation | * | | | | * | function of the AFF filter. |
| | | Decimation | * | * | | | * | |
| Field based video | Progressive | No scaling | | | * | | | The FIR filter could subsume the de- |
| | | Interpolation | * | | * | | | interface function. |
| | | Decimation | * | * | * | | | |
| | Interlace | No scaling | | | | | | No filtering is used. |
| | | Interpolation | * | | | | | High quality filtering is used. |
| | | Decimation | * | * | | | | |
| Graphics | Progressive | No scaling | | | | | | No filtering is used |
| | | ARC | | | | * | | The FIR filter could subsume the |
| | | Interpolation | * | | | | | function of the ARC. |
| | | Decimation | * | * | | | | Decimating a graphics plane is seldom used. This feature is optional. |
| | Interlace | No scaling | | | | | * | Anti-flutter filtering is applied on top |
| | | ARC | | | | * | * | of other filter operations. |
| | | Interpolation | * | | | | * | |
| | | Decimation | * | * | | | * | |

As illustrated in Table 1, no filtering is used in a first configuration of a filter module comprising frame based video with a progressive display type during a no scaling operation. Therefore, no filters are used in this first filter module. High quality filtering is used in a second configuration of frame module comprising frame based video with a progressive display type during an interpolation operation. An FIR filter may be used in this display mode. Table 1 also illustrates that high quality filtering is also used in a third configuration of a frame module comprising frame based video with a progressive display type during a decimation operation. An FIR filter and pre-filtering may be used in this display mode.

A fourth configuration of the filter module illustrated in Table 1 is used with frame based video, with an interlaced display type during a no scaling operation. The module comprises an AFF filter, where the FIR filter may subsume the functions of the AFF filter. However, some frame pictures are pre-filtered for displaying as an interface. In this configuration, no AFF filter is used. A fifth configuration of a frame module used in frame based video with an interlaced display type during an interpolation operation is also illustrated. This module comprises a FIR filter used with an AFF filter. A sixth video with an interlaced display type during an interpolation operation is further illustrated. In this module, high quality filtering is provided by an FIR filter. A twelfth configuration of a filter module comprising an FIR filter and pre-filtering may be used in a field based video with an interlaced display type during a decimation operation.

Table 1 illustrates a thirteenth configuration of a filter module that uses no filtering with a graphics picture type with a progressive display type during a no scaling operation. A fourteenth configuration of a filter module comprises an ARC filter, where an FIR filter may subsume the function of the ARC filter in graphics picture type with progressive display type during an ARC operation. A fifteenth configuration of a frame module used with a graphics picture type with a progressive display type during an interpolation operation is also illustrated. In this configuration, an FIR filter may be used, where again the FIR filter may subsume the functions of an ARC filter. A sixteenth configuration of a filter module, comprising an FIR filter and pre-filtering, may be used in a graphics picture type having a progressive display type during a decimation operation.

A seventeenth configuration of a filter module is illustrated in Table 1 and comprises an AFF or anti-flutter filter used with a graphics picture type with an interlaced display type during a no scaling operation. An eighteenth configuration of a filter module, comprising ARC and AFF filters, where the anti-fluttering filtering is applied on top of other operations, is used with a graphics picture type having interlaced display type during an ARC operation. A nineteenth configuration of a frame module used with a graphics picture type with an interlaced display type during an interpolation operation is illustrated, where the filter module comprises FIR and AFF filters. A twentieth configuration of a filter module, comprising an FIR filter, pre-filtering and an AFF filter, may be used with a graphics picture type having interlaced display type during a decimation operation. While a frame module having twenty configurations is provided, more and different configurations are contemplated.

Figure 9:
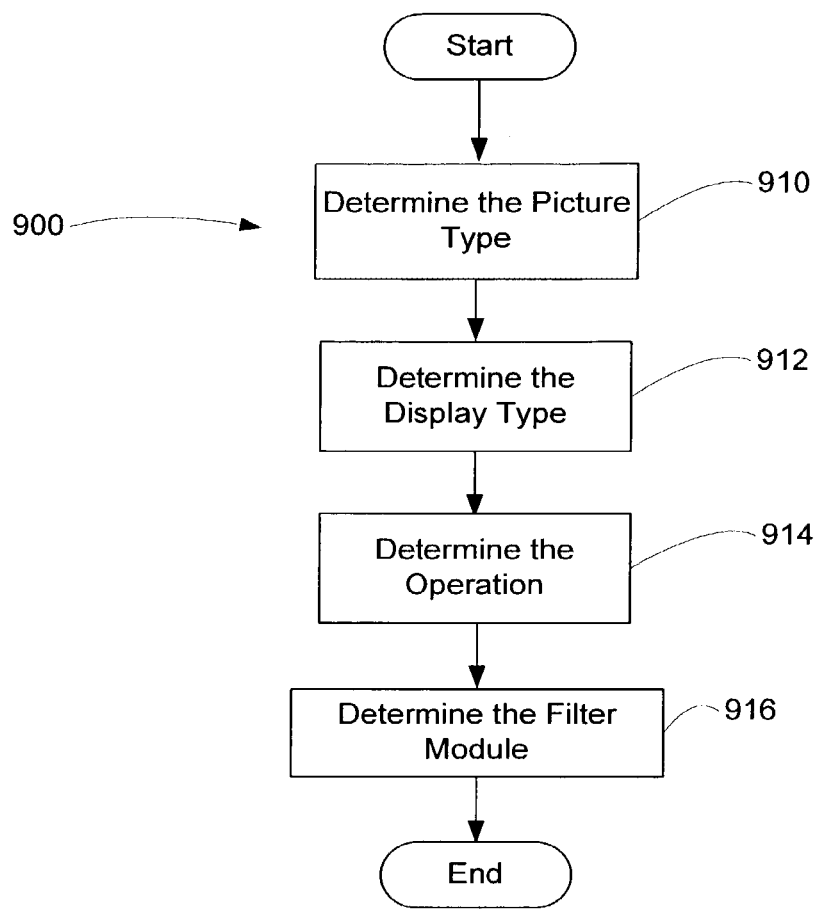
FIG. 9 illustrates one embodiment of a high level flow diagram of a method of determining a filter module in a video decoding system in accordance with one embodiment of the present invention.

FIG. 9 illustrates a high level flow diagram of a method for determining the configuration of filters from a plurality of filters in a filter module, generally designated 900. More specifically, the flow diagram illustrates a method for determining the configuration of a filter module in a video decoding system. In this embodiment, the method 900 comprises determining a picture type (for example frame based video, field based video or graphics) as illustrated by block 910. Method 900 comprises determining the display type (for example progressive or interlaced) and the operation (for example no scaling, interpolation, decimation or ARC) as illustrated by blocks 912 and 914. The filter module is then determined on the fly (i.e., using FIR filters, pre-filtering, de-interlace filtering, ARC filters, AFF filters or some combination) as illustrated by block 916.

Figure 10A:
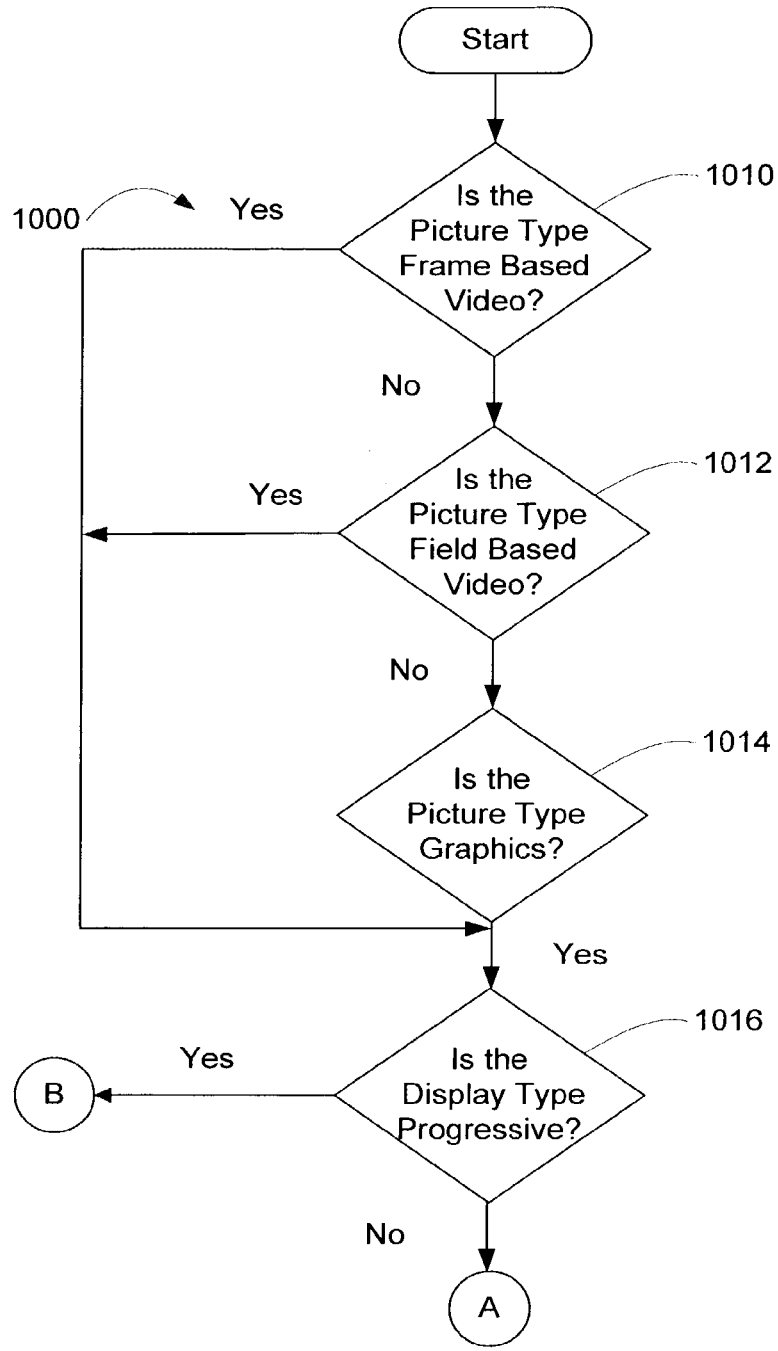
FIGS. 10A, 10B and 10C illustrate a flow chart illustrating a method of determining a filter module used in a video decoding system in accordance with one embodiment of the present invention.
Figure 10B:
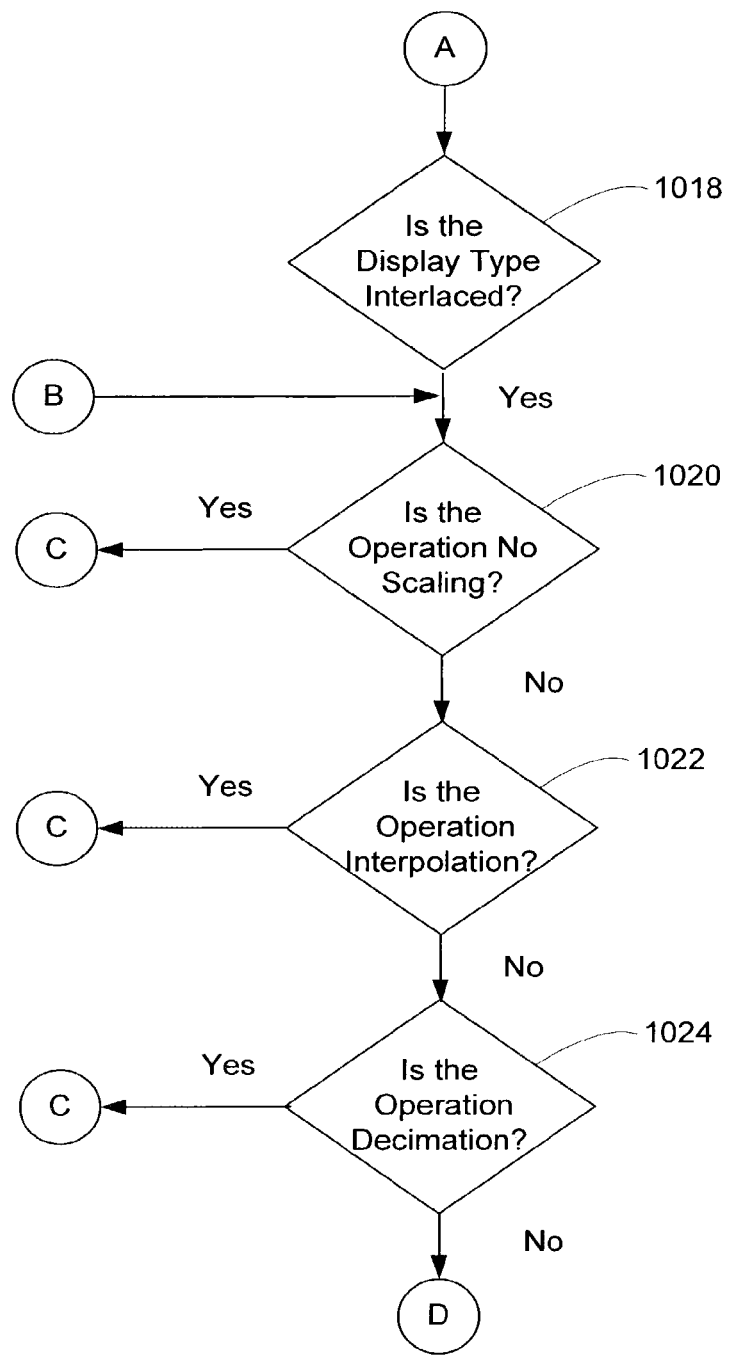
Figure 10C:
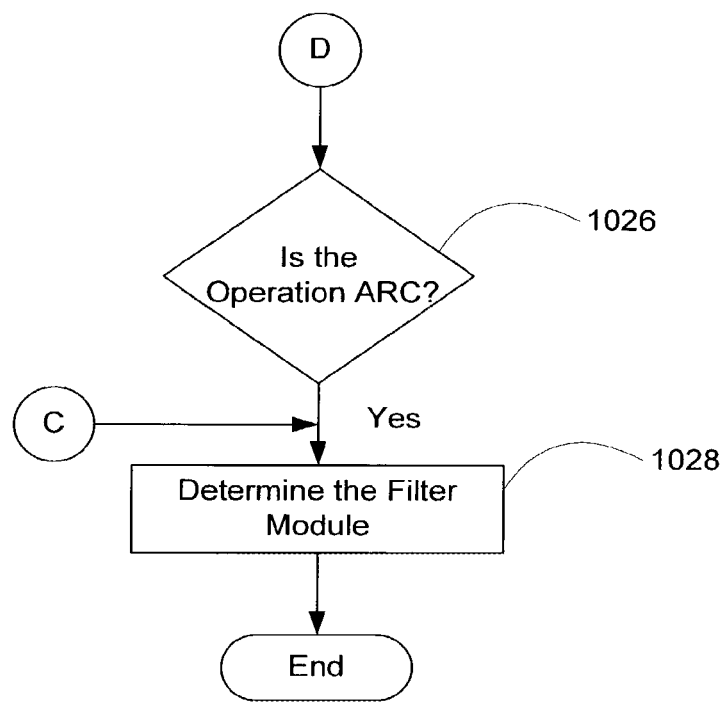

FIGS. 10A, 10B and 10C illustrate one embodiment of method for determining a filter configuration (i.e., determining one configuration from a plurality of possible configurations) in a filter mode, generally designated 1000. More specifically, the flow diagram illustrates a method for determining a filter module in a network video decoding system adapted to form a display pipeline from a plurality of possible display pipelines. This method comprises determining if the picture type is a frame based video, field based video or graphics as illustrated by diamonds 1010, 1012 and 1014 respectively.

Method 1000, in one embodiment, comprises determining if the display type is progressive or interlaced as illustrated by diamonds 1016 and 1018 respectively. The method determines if the operation is no scaling, interpolation, decimation or ARC as illustrated by diamonds 1020, 1022, 1024 and 1026 respectively. The method then comprises determining the filter module (comprising one or more FIR filters, pre-filtering, de-interlace filtering, one or more ARC filters, AFF filters or some combination) on the fly as illustrated by block 1028.

Many modifications and variations of the present invention are possible in light of the above teachings. Thus, it is to be understood that, within the scope of the appended claims, the invention may be practiced otherwise than as described hereinabove.

The invention claimed is:

1. A method of operating a filter module in a video display system, said method comprising:
   determining a picture type of a plurality of video streams;
   determining an encoding type of at least one video encoder device; and
   determining in real time, a plurality of concurrent filter configurations, wherein each of a corresponding one of the plurality of concurrent filter configurations is for a particular one of the plurality of video streams, wherein each of the plurality of concurrent filter configurations is based at least in part on the picture type of the particular one of the plurality of video streams and the encoding type of the at least one video encoder device; and
   concurrently outputting each of the plurality of video streams filtered by the plurality of concurrent filter configurations.

2. The method of claim 1, wherein determining the picture type of the plurality of video streams further comprises determining if the picture type is frame based video, field based video, or graphics.

3. The method of claim 1, further comprising:
   determining whether an interpolation or a decimation operation is to be performed on each of the plurality of video streams,
   wherein determining in real time, the plurality of concurrent filter configurations is based at least in part on whether the interpolation or the decimation operation is to be performed on the particular one of the plurality of video streams.

4. The method of claim 1, wherein each of the plurality of concurrent filter configurations is determined in accordance with at least one register write instruction.

5. The method of claim 1, wherein the at least one video encoder device further comprises a plurality of concurrent video encoder devices, wherein each of the plurality of video encoder devices correspond to a particular one of the video streams, and wherein the plurality of concurrent filter configurations are also determined based at least in part on a display type of one of the plurality of concurrent video encoder devices that corresponds to the particular one of the video streams.

6. The method of claim 1, wherein said plurality of concurrent filter configurations corresponds to a plurality of finite impulse response filters.

7. A non-transitory computer readable medium, said non-transitory computer readable medium storing a plurality of instructions, wherein the plurality of instructions comprises:
   determining a picture type of a plurality of video streams;
   determining an encoding type of at least one video encoder device; and
   determining, in real time, a plurality of concurrent filter configurations, wherein each of a corresponding one of the plurality of concurrent filter configurations is for a particular one of the plurality of video streams, wherein each of the plurality of concurrent filter configurations is based at least in part on the picture type of the particular one of the plurality of video streams and the encoding type of the at least one video encoder device; and
   concurrently outputting each of the plurality of video streams filtered by the plurality of concurrent filter configurations to at least one display.

8. The non-transitory computer readable medium of claim 7, wherein determining the picture type of the plurality of video streams further comprises determining if the picture type is frame based video, field based video, or graphics.

9. The non-transitory computer readable medium of claim 7, wherein said plurality of instructions further comprises:
   determining whether an interpolation or a decimation operation are to be performed on each of the plurality of video streams,
   wherein determining, in real time, the plurality of concurrent filter configurations is based at least in part on whether the interpolation or the decimation operation is to be performed on the particular one of the plurality of video streams.

10. The non-transitory computer readable medium of claim 7, wherein each of the plurality of concurrent filter configurations is determined in accordance with at least one register write instruction.

11. The non-transitory computer readable medium of claim 7, wherein the at least one display further comprises a plurality of concurrent video encoder devices, wherein each of the plurality of concurrent video encoder devices corresponds to a particular one of the video streams, and wherein the plurality of concurrent filter configurations is also determined based at least in part on the encoding type of one of the plurality of concurrent video encoder devices that corresponds to the particular video stream.

12. The non-transitory computer readable medium of claim 7, wherein said non-transitory computer readable medium is integrated onto an integrated circuit.

13. The non-transitory computer readable medium of claim 7, wherein said plurality of concurrent filter configurations corresponds to a plurality of finite impulse response filters.

14. A system for operating a filter module in a video display system, said system comprising:
   a first circuit for determining a picture type of a plurality of video streams;
   a second circuit for determining an encoding type of at least one video encoder device; and
   a third circuit for determining in real time, a plurality of concurrent filter configurations, wherein each of a corresponding one of the plurality of concurrent filter configurations is for a particular one of the plurality of video streams, wherein each of the plurality of concurrent filter configurations is based at least in part on the picture type of the particular one of the plurality of video streams and the encoding type of the at least one video encoder device; and
   a fourth circuit for concurrently outputting each of the plurality of video streams filtered by the plurality of concurrent filter configurations.

15. The system of claim 14, wherein determining the picture type of the plurality of video streams further comprises determining if the picture type is frame based video, field based video, or graphics.

16. The system of claim 14, further comprising:
   a fifth circuit for determining whether an interpolation or a decimation operation are to be performed on each of the plurality of video streams,
   wherein determining, in real time, the plurality of concurrent filter configurations is based at least in part on whether the interpolation or the decimation operation is to be performed on the particular one of the plurality of video streams.

17. The system of claim 14, wherein each of the plurality of concurrent filter configurations is determined in accordance with at least one register write instruction.

18. The system of claim 14, wherein the at least one video encoder device further comprises a plurality of concurrent video encoder devices, wherein each of the plurality of concurrent video encoder devices are correspond to a particular one of the video streams, and wherein the plurality of concurrent filter configurations are determined based at least in part on a display type of one of the plurality of concurrent video encoder devices that corresponds to the particular video stream.

19. The system of claim 14, wherein said system is integrated onto an integrated circuit.

20. The system of claim 14, wherein said plurality of concurrent filter configurations corresponds to a plurality of finite impulse response filters.

* * * * *